United States Patent [19]

Tanaka

[11] Patent Number: 4,849,251
[45] Date of Patent: Jul. 18, 1989

[54] METHOD OF MANUFACTURING AN ELECTRIC RESISTANCE ELEMENT

[75] Inventor: Masatoshi Tanaka, Osaka, Japan

[73] Assignee: Sumitomo Electric Industries, Ltd., Osaka, Japan

[21] Appl. No.: 186,778

[22] Filed: Apr. 25, 1988

Related U.S. Application Data

[63] Continuation of Ser. No. 899,808, Aug. 25, 1986, abandoned.

[30] Foreign Application Priority Data

Aug. 27, 1985 [JP] Japan .................................. 60-189084

[51] Int. Cl.$^4$ .............................................. B05T 5/12
[52] U.S. Cl. ..................................... 427/101; 427/122; 427/299; 427/386; 427/389.7; 427/393.5; 427/287
[58] Field of Search .................. 427/58, 215, 511, 122, 427/299, 386, 389.7, 393.5, 287

[56] References Cited

U.S. PATENT DOCUMENTS 2,825,702  3/1958  Silversher .......................... 252/511
3,342,752  9/1967  Wada ................................. 252/511
3,723,607  3/1973  Kalmin ............................... 523/215

*Primary Examiner*—Thurman K. Page
*Assistant Examiner*—Leon R. Horne
*Attorney, Agent, or Firm*—W. G. Fasse; D. H. Kane, Jr.

[57] ABSTRACT

A method for manufacturing an electric resistance element first prepares carbon particles by thermally treating these particles, such as carbon black at a temperature of at least 300° C. Then a separate mixture of the carbon particles in an epoxy resin is prepared by mixing the carbon particles with a solution of an amino resin to at least partially cause adsorption, occlusion or reaction between the carbon particles and the amino resin. Then the amino resin is polymerized by heating. A further mixture is prepared by mixing a solution of epoxy resin with the first mixture to prepare a paste material which is then coated onto the surface of a substrate. The coating is then thermally cure to form a resistance film on the surface of the substrate.

12 Claims, 1 Drawing Sheet

METHOD OF MANUFACTURING AN ELECTRIC RESISTANCE ELEMENT

This application is a continuation of application Ser. No. 899,808, filed Aug. 25, 1986, now abandoned.

BACKGROUND OF THE INVENTION

1. Field of the Invention

The present invention relates to a method of manufacturing an electric resistance element.

2. Description of the Prior Art

Certain electric resistance elements have been manufactured by coating a resistance paste material prepared of carbon particles and organic synthetic resin, on the surface of an insulator by a method such as screen printing to form a resistance film.

A conventional method of manufacturing an electric resistance element of this type, comprises a step of kneading carbon particles and a solution of thermosetting resin to prepare a paste material; a step of screen-printing the paste material on the surface of a substrate (particularly an insulator such as a laminated plate of phenol resin or epoxy resin, an alumina ceramic plate or a metallic core substrate ) in the form of a pattern; a step of removing a solvent by application of heat and further heating the substrate at a temperature of, e.g., 100° to 150° C. to cure the resin thereby to form a resistance film; and a step of mounting an electrode on the part of the resistance film by a conductive paint such as silver paste. The thermosetting resin is prepared of phenol resin, epoxy resin, melamine resin, urea-formaldehyde resin, alkyd resin or acrylic resin, or a mixture thereof.

However, the electric resistance element manufactured by the conventional method has significant disadvantages. One such disadvantage is seen in that the resistance is extremely varied and inferior in stability relative to environmental conditions The most likely cause for such disadvantages is that the carbon particles are non-uniformly arranged in the resin while the resin does not adhere uniformly to the surfaces of the carbon particles whereby the interfaces between the carbon particles are varied, leading to instable contact resistances. This is based on the principle that the resistance of an electric resistance element is not determined by a volume specific resistance of carbon particles, but rather by contact resistances thereof.

SUMMARY OF THE INVENTION

An object of the present invention is to provide a method of manufacturing an electric resistance element which does not have the disadvantages described above.

In order to overcome the aforementioned disadvantages, it is necessary to uniformize and stabilize the surfaces of carbon particles and, to uniformly disperse the carbon particles throughout a resin binder.

The method according to the present invention for manufacturing an electric resistance element comprises (a) a step of thermally treating carbon particles at a temperature of at least 300° C.; (b) a step of separately preparing a mixture of carbon particles and a binder resin by mixing the carbon particles with a solution of amino resin and heating the same to at least partially cause adsorption, occlusion or reaction, hereinafter simply referred to as "reaction", between the carbon particles and the amino resin and polymerization of the amino resin; (c) a step of mixing a solution of epoxy resin with the mixture to prepare a paste material; and (d) a step of coating the paste material on the surface of a substrate and curing the same by heating, for forming a resistance film on the surface of the substrate.

The present invention is characterized in that the carbon particles are thermally treated at a temperature of at least 300° C. and that two types of resin materials, i.e., amino resin and epoxy resin are employed.

The carbon particles are prepared of acetylene black, furnace black, channel black, thermal black or the like, and the grain size thereof is preferably 0.001 to 1.00 μm.

The amino resin is prepared by general amino resin, preferably in the form of a polymer of a reactant such as methylol urea or methylol melamine of urea or melamine and formaldehyde, particularly a polymer of methylol urea or methylol melamine reacted with an alcohol particularly methanol or butanol. The methylol urea or methylol melamine may be employed in the form before a reaction, i.e., in the form of a mixture of melamine or urea and formaldehyde. The molecular ratio of melamine or urea to formaldehyde is preferably within the range of 1.0:1.0 to 1.0:0.3.

Epoxy resin is preferably of the bisphenol A type, while the novolac phenol type is also employable.

The substrate is made of an organic material such as paper, phenol resin, epoxy resin or polyimide or a laminated plate thereof, alumina ceramic, various ceramics, a glass plate or a metallic core substrate. Any substrate may be previously provided with a resistance terminal made of metal such as Ag, Au or Ag-Pd or a conductive paint including conductor of such metal.

The method according to the present invention will now be described in detail.

(a) Carbon particles are thermally treated at a temperature of at least 300° C., preferably 400° to 500° C. It is critical that the heat treatment is performed for a period exceeding that in which gas generation is stopped for obtaining carbon particles of uniform surface quality. In this case, the heat treatment is preferably performed under decompression through, e.g., a water aspirator. The carbon particles generally adsorb gas, moisture and the like generated in the manufacturing process, and such adsorbed materials are removed by the heat treatment. Thus, the carbon particles are activated and the surfaces thereof are uniformized. Cooling after the heat treatment is preferably performed in a closed system so that the carbon particles are not in contact with fresh air.

(b) The carbon particles are mixed with a solution of amino resin and heated to at least partially cause reaction of the carbon particles to the amino resin and polymerization of the amino resin. The amino resin is preferably added by aspiration under decompression. The weight ratio of the carbon particles to the amino resin is generally 1:1 to 1:5. The amino resin is previously dissolved in a solvent to be employed in the form of a solution. The solvent can be prepared by any solvent on condition that the same is capable of dissolving amino resin, preferably by, e.g., n-butanol, MEK, diacetone alcohol or cellosolve. The concentration of this solution is generally 40 to 60%, although the same is varied with the types of the amino resin and the solvent. A carbon-resin partially polymerized polymer, hereinafter referred to as "CB mixture", is formed by heating, whereby the surfaces of the carbon particles are uniformized and stabilized. The reaction by heating is preferably performed such that the degree of polymerization of the amino resin reaches ⅓ to ½ of the final degree of polymerization thereof. The heating temperature and the time for the reaction are, for example, at least 100° C. and several ten minutes, although the same are varied with the types and volume of the carbon particles and the amino resin. The reaction is stopped by stopping the heating and lowering the temperature to, e.g., the room temperature. Although the reaction is preferably performed after evaporation of the solvent for the amino resin, such evaporation may be completed during the reaction. The solvent is preferably evaporated under a decompressed state in a vacuum, for example.

(c) A solution of epoxy resin is mixed with the CB mixture to prepare a paste material. The weight ratio of the epoxy resin to the amino resin is preferably 1:1.2 to 1:1. A solvent in the solution of epoxy resin can be prepared by any solvent on condition that the same is capable of dissolving the epoxy resin, and preferably, by, e.g., butyl cellosolve. The concentration of the epoxy resin solution is generally 40 to 60%, although the same is varied with the types of the epoxy resin and the solvent as employed. A uniform paste material is prepared by sufficient kneading and dispersion.

(d) The paste material is coated on the surface of a substrate and cured to form a resistance film on the surface of the substrate. Prior to the coating process, the solvent is further added to the paste material to appropriately adjust its viscosity for coating. The viscosity of the paste material in the coating process is generally 40,000 to 80,000 cp. The paste material is coated by screen printing, preferably through a screen of 200 to 325 mesh. After the screen printing, levelling is preferably performed by leaving the substrate for five to 10 minutes at room temperature. The paste material is generally cured by heating the same at 150° to 200° C. for 90 to 180 minutes, although the heating temperature and time are varied with the composition of the paste material as employed. Although it is preferable to evaporate the solvent contained in the paste material in advance to the curing process, such evaporation may be performed after the paste material is cured. The resistance film is preferably formed after a terminal electrode is provided on the substrate, while the other terminal electrode may be provided after formation of the resistance film. The final thickness of the resistance film thus formed is preferably 10 to 20 microns in general. If necessary, a protective coat is applied on the resistance film.

In the resistance film formed by the method according to the present invention, carbon particles and epoxy resin are particularly arranged and uniformly distributed throughout the volume of the amino resin. Thus, the carbon particles are uniformly dispersed and arranged in the electric resistance film.

Typical advantages of the present invention are as follows: (1) a small variation in resistance and a good reproducibility; (2) a high stability against environmental influences; (3) a good current load characteristic: the current load characteristic of the resistance element according to the present invention is about 45 mW/mm$^2$ while that of a comparable conventional resistor has been about 15 mW/mm$^2$; and (4) a low current noise.

Such advantages have been obtained since the carbon particles are uniformized in surface quality and uniformly arranged due to removal of the adsorbed materials.

The electric resistance element according to the present invention is suitable for a variable or for a fixed resistor, to be applied to an integrated circuit or the like. When the resistance element is applied as a fixed resistor, the same is preferably protected by an appropriate protective coating such as an insulating moisture-proof coating.

These and other objects, features, aspects and advantages of the present invention will become more apparent from the following detailed description of the present invention when taken in conjunction with the accompanying drawing.

DESCRIPTION OF THE PREFERRED EMBODIMENTS

EXAMPLE 1

Figure 1:
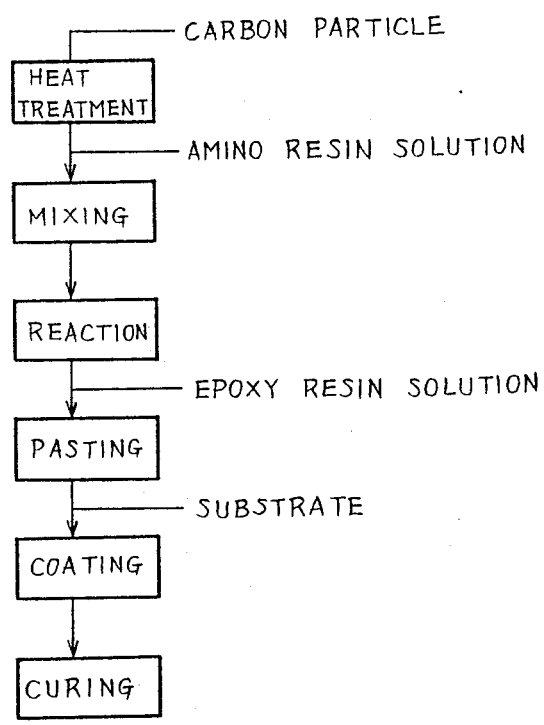
FIG. 1 is a process diagram schematically showing the steps of the method according to the present invention.

100 g of acetylene black particles of 0.01 to 0.5 $\mu$m in mean grain size were thermally treated in a porcelain vessel with a stock cock at 380° C. under the normal pressure for 47 minutes, and then cooled to room temperature. A solution of 150 g of methylated methylol melamine and 300 ml of a solvent of butanol/cellosolve equivalent-weight mixture was added to the carbon particles, which were then heated at 80° C. for two hours to remove the solvent, and again heated at 120° C. for 35 minutes to cause reaction. Then the mixture was quenched to room temperature, and a solution of 150 g of bisphenol A type epoxy resin, epoxy equivalent (EV)=500, and 150 ml of butyl cellosolve was added and sufficiently kneaded to prepare a paste material. The paste material contained about 70 percent by weight of solid components. Butyl cellosolve was further added to adjust the content of the solid components to 60 to 65 percent by weight thereby to obtain a viscosity of 68,000 cp. The paste material was coated on the surface of a single-face copper-plated glass epoxy substrate through a screen of 250 mesh, to form a film of 17.5 microns in thickness. Then the substance was heated at 170° C. for 90 minutes to cure the film, thereby to form a resistance element. The final thickness of the film was 15 microns. Design sheet resistivity of the resistance element was 3.75 k$\Omega$/□, while measured sheet resistivity was 3.5 k$\Omega$/□.

EXAMPLE 2

78 g of thermal black particles of 0.5 to 1.0 $\mu$m mean grain size were thermally treated in a porcelain vessel with a stock cock at 430° C. under a pressure lower by 55 mmHg than the normal pressure for 40 minutes, and then cooled to room temperature. A solution of 150 g of butylated methylol melamine and 150 ml of a solvent of butanol/MEK equivalent volume mixture was added to the carbon particles, which were then heated at 85° C. for 1.5 hours to remove the solvent, and further heated at 100° C. for 35 minutes to cause reaction. Then the mixture was quenched to room temperature, and a solution of 150 g of bisphenol A type epoxy resin, EV=500, and 150 ml of butyl cellosolve was added and sufficiently kneaded to prepare a paste material. The paste material contained about 71 percent by weight of solid components. Butyl cellosolve was further added to adjust the viscosity to 70,000 cp, and the paste material was coated on the surface of a single-face copper-plated glass epoxy substrate through a screen of 250 mesh, to form a film of 18.0 microns in thickness. Then the substance was heated at 170° C. for 90 minutes to cure the fiklm, thereby to form a resistance element. The final thickness of the film was 15 microns. Design sheet resistivity of the resistance element was 5.0 k/Ω/□, while measured sheet resistivity was 4.75 kΩ/□.

EXAMPLE 3

57 g of channel black particles of 0.001 to 0.03 μm mean grain size were thermally treated in a porcelain vessel with a stock cock at 415° C. under the normal pressure for 65 minutes, and cooled to room temperature. A solution of 150 g of butylated methylol urea and 150 ml of MEK was added to the carbon particles, which were then heated at 80° C. for one hour to remove the solvent, and further heated at 100° C. for 35 minutes to cause reaction. Then the mixture was quenched to room temperature, and a solution of 150 g of bisphenol A type epoxy resin, EV=750, and 100 ml of butyl cellosolve was added and sufficiently kneaded to prepare a paste material. The paste material contained about 78 percent by weight of solid components. Butyl cellosolve was further added to adjust the viscosity to 70,000 cp, and the paste material was coated on a single-face copper-plated glass epoxy substrate through a screen of 250 mesh, to form a film of 16.0 microns in thickness. Then the substance was heated at 180° C. for 120 minutes to cure the film, thereby to form a resistance element. The final thickness of the film was 15 microns. Design sheet resistivity of the resistance element was 7.5 kΩ/□, while measured sheet resistivity was 6.3 kΩ/□.

EXAMPLE 4

35 g of furnace black particles of 0.05 to 0.1 μm mean grain size were thermally treated in a porcelain vessel with a stock cock at 450° C. under a pressure lower by 30 mmHg than the normal pressure for 70 minutes, and then cooled to room temperature. A solution of 150 g of methylated methylol urea and 150 ml of MEK was added to the carbon particles, which were then heated at 85° C. for two hours to remove the solvent, and further heated at 130° C. for 25 minutes to cause reaction of urea-formaldehyde resin. Then the mixture was quenched to room temperature, and a solution of 180 g of bisphenol A type epoxy resin, EV=750, and 180 ml of butyl cellosolve was added and sufficiently kneaded to prepare a paste material. The paste material contained about 67 percent by weight of solid components. Butyl cellosolve was further added to adjust the viscosity to 68,000 cp, and the paste material was coated on the surface of a single-face copper-plated glass epoxy substrate through a screen of 250 mesh, to form a film of 16.0 microns in thickness. Then the substance was heated at 180° C. for 120 minutes to cure the film, thereby to form a resistance element. The final thickness of the film was 15 microns. Design sheet resistivity of the resistance element was 25 kΩ/□, while measured sheet resistivity was 26.5 kΩ/□.

REFERENCE EXAMPLE 1

A solution of 300 g of epoxy resin, EV=500, and 350 ml of butyl cellosolve was added to 150 g of acetylene black particles of 0.01 to 0.5 μm mean grain size and sufficiently kneaded to prepare a paste material. The paste material contained 57.0 percent by weight of solid components. 6.0 phr of an amine curing agent, ethylene diamine, was added to the paste material in viscosity of 62,000 cp, and coated on a single-face copper-plated glass epoxy substrate through a screen of 250 mesh, to form a film of 18.0 microns in thickness. Then the substance was heated at 180° C. for 90 minutes to cure the film, thereby to form a resistance element. The final thickness of the film was 15 microns. Design sheet resistivity of the resistance element was 4.3 kΩ/□, while measured sheet resistivity was 4.0 kΩ/□.

REFERENCE EXAMPLE 2

A solution of 230 g of epoxy resin, EV=350, and 220 ml of butyl cellosolve was added to 150 g of acetylene black particles of 0.5 to 1.0 μm mean grain size and sufficiently kneaded to prepare a paste material. The paste material contained 63.5 percent by weight of solid components. 8 phr of a curing agent of diethylene triamine was added to the paste material in viscosity of 63,000 cp and coated on a single-face copper-plated glass epoxy substrate through a screen of 250 mesh, to form a film of 15.7 microns in thickness. Then the substance was heated at 180° C. for 90 minutes to harden the film, thereby to form a resistance element. The final film thickness was 15 microns. Design sheet resistivity of the resistance element was 1.5 kΩ/□, while measured sheet resistivity was 1.75 kΩ/□.

EXPERIMENTS

The resistance elements manufactured by the Examples 1 to 4 and the reference examples 1 and 2 were subjected to evaluation of electric characteristics, resistance temperature characteristics and reliability. The results are shown in Table 1, which also shows the results of levelling.

Variations in resistance represent ratios of expansion of measured resistance values with respect to design resistance values. Moisture heat resistance characteristics represent rates of resistance changes caused when the samples were retained at 40°±2° C. and 90 to 95% R.H. for 1000 hours. Thermal shock resistance change rates represent resistance change rates after applying temperature cycles of −55° C.→room temperature→+85° C. to the samples continuously five times. Solder dip resistance characteristics represent resistance change rates before and after dipping the samples in solder of 260° C. for 10 seconds. Heat resistance change rates represent rates of resistance changes caused when the samples were left at 85° C. for 1000 hours. Levelling was performed by leaving the samples at 25° C. for 10 minutes.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| | | Example 1 | Example 2 | Example 3 | Example 4 | Reference Example 1 | Reference Example 2 |
|---|---|---|---|---|---|---|---|
| Electric Characteristics | Variation in Resistance | ±12 | ±16 | ±14 | ±17 | ±21 | ±19 |
| | Resistance Temperature Characteristics | +118 | +105 | +225 | +530 | +420 | +350 |

TABLE 1-continued

|  |  | Example 1 | Example 2 | Example 3 | Example 4 | Reference Example 1 | Reference Example 2 |
|---|---|---|---|---|---|---|---|
| Reliability | Resistance Temperature Characteristics (ppm/°C.) 25 to −25° C. | | | | | | |
|  | Resistance Temperature Characteristics (ppm/°C.) 25 to 85° C. | −115 | −120 | −175 | −250 | −580 | −225 |
|  | Current Noise Index (dB/decade) | 12.6 | 16.0 | 17.8 | 21.8 | 26.3 | 21.5 |
|  | Moisture Heat Resistance Characteristics (%) | +1.05 | +1.38 | +1.77 | +1.8 | +3.50 | +4.70 |
|  | Thermal Shock Resistance Change Rate (%) | +1.80 | +1.05 | +1.10 | +0.80 | +3.40 | +5.0 |
|  | Solder Dip Resistance Characteristics (Change Rate, %) | −0.85 | −1.01 | −1.05 | −0.90 | −3.0 | −2.55 |
|  | Heat Resistance Change Rate (%) | +1.02 | +0.91 | +0.87 | +0.94 | +2.20 | +1.99 |
| Levelling |  | Good | Good | Good | Rather Good | Bad | Bad |

What is claimed is:

1. A method of manufacturing an electric resistance element, comprising the steps of:
   (a) thermally treating carbon particles in a separate first heating step at a temperature of at least 300° C. but not exceeding 500° C. for a time duration sufficient to stop substantially any gas generation for providing heat treated carbon particles having a substantially uniform surface;
   (b) separately preparing a mixture by mixing said heat treated carbon particles with a solution of an amino resin selected from the group consisting of methylated or butylated urea-formaldehyde resin and methylated or butylated melamine-formaldehyde resin in a first solvent for said amino resin to form said solution and to at least partially cause reaction between said heat treated carbon particles and said amino resin and polymerizing said amino resin by heating said mixture in a second heating step to form a heated mixture;
   (c) mixing a solution of a bisphenol A-type epoxy resin and a second solvent for said epoxy resin into said heated mixture to prepare a paste material; and
   (d) coating said paste material on a surface of a substrate and thermally curing the paste material, thereby to form a resistance film on the surface of said substrate.

2. The method of claim 1, wherein said carbon particles are thermally treated at a temperature of 400° to 500° C. in said first heating step.

3. The method of claim 1, wherein said first heating step is performed when said carbon particles are in a decompressed state.

4. The method of claim 1, wherein both said reaction between said carbon particles and said amino resin and said polymerization of said amino resin are performed after evaporation of said respective solvent for said amino resin.

5. The method of claim 1, wherein said paste material is coated by screen printing on said surface of said substrate.

6. The method of claim 1, wherein said paste material is thermally cured after evaporation of said second solvent for said bisphenol A-type epoxy resin forming said paste material.

7. The method of claim 1, wherein said carbon particles have a mean grain size in the range of 0.001 to 1.00 μm.

8. The method of claim 1, wherein said epoxy resin includes in addition to said bisphenol A-type epoxy resin, a novolac phenol type resin in said second solvent.

9. The method of claim 1, wherein the weight ratio of said carbon particles to said amino resin is within the range of 1:1 to 1:5.

10. The method of claim 1, wherein the weight ratio of said epoxy resin to said amino resin is within the range of 1:1.2 to 1:1.

11. An electric resistance element manufactured by a method comprising the steps of:
   (a) thermally treating carbon particles in a first heating step at a temperature of at least 300° C. but not exceeding 500° C. for a time duration sufficient to stop substantially any gas generation for providing heat treated carbon particles having a substantially uniform surface;
   (b) separately preparing a mixture by mixing said carbon particles with a solution of an amino resin selected from the group consisting of methylated or butylated urea-formaldehyde resin and methylated or butylated melamine-formaldehyde resin in a first solvent for said amino resin to form said solution and to at least partially cause reaction between said heat treated carbon particles and said amino resin and polymerizing said amino resin by heating said mixture in a second heating step to form a heated mixture;
   (c) mixing a solution of a bisphenol A-type epoxy resin and a second solvent for said epoxy resin into said heated mixture to prepare a paste material; and
   (d) coating said paste material on a surface of a substrate and thermally curing the paste material, thereby to form a resistance film on the surface of said substrate.

12. The electric resistance element of claim 11, wherein said resistance film is 10 to 20 μm in thickness.

* * * * *

UNITED STATES PATENT AND TRADEMARK OFFICE
CERTIFICATE OF CORRECTION

PATENT NO. : 4,849,251

DATED : July 18, 1989

INVENTOR(S) : Masatoshi Tanaka

It is certified that error appears in the above-identified patent and that said Letters Patent is hereby corrected as shown below:

On the title page, ABSTRACT, line 10, after "of" insert --an--.

Signed and Sealed this

Eighteenth Day of September, 1990

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,849,251

DATED : July 18, 1989

INVENTOR(S) : Masatoshi Tanaka

It is certified that error appears in the above-identified patent and that said Letters Patent is hereby corrected as shown below:

Column 2, line 35, replace "It is" by --The heat--,
         line 36, delete "critical that the heat",
         line 37, delete "for",
         line 38, delete "obtaining carbon particles of uniform surface quality";

Column 7, claim 1, step a, line 21, delete "but not exceeding 500°C.",

Column 8, claim 11, step a, line 33, delete "but not"
                            line 34, delete "exceeding 500°C.".

Signed and Sealed this

Thirtieth Day of October, 1990

Attest:

HARRY F. MANBECK, JR.

*Attesting Officer*      *Commissioner of Patents and Trademarks*